United States Statutory Invention Registration [19]

[11] Reg. Number: H235

Kugel et al. [43] Published: Mar. 3, 1987

[54] IN-SITU DETERMINATION OF ENERGY SPECIES YIELDS OF INTENSE PARTICLE BEAMS

[75] Inventors: Henry W. Kugel, Somerset, N.J.; Robert Kaita, Englishtown, N.J.

[73] Assignee: The United States of America as represented by the United States Department of Energy, Washington, D.C.

[21] Appl. No.: 854,666

[22] Filed: Apr. 18, 1986

Related U.S. Application Data

[63] Continuation of Ser. No. 535,974, Sep. 26, 1983, abandoned.

[51] Int. Cl.[4] ..... G21B 1/00

[52] U.S. Cl. ..... 376/143; 376/130

[56] References Cited

PUBLICATIONS

Nuclear Technology/Fusion vol. 2, 10/82, pp. 712–722, Kugel et al.

Bull. Am. Phys. Soc. 27, pp. 1049, 1050, 10/82, Kugel et al.

ORNL/TM-8360 (Aug. 1982), Tsai et al.

J. of Nuclear Materials, 93 and 94, (1980), Langley et al, pp. 390–395; Uecker et al, pp. 670–678; Pospieszczyk et al, pp. 396–401; Braun et al, pp. 728–733; Zuhr et al, (I), pp. 127–132; Wampler et al. pp. 139–145; Roberto et al, pp. 146–149.

Rev. Sci. Instrum. 52(12), Dec. 1981, Kaita et al, pp. 1795–1801.

INTOR Zero Phase, International Atomic Energy Agency, Vienna, 1980, pp. 324–329.

Conf. 9th Symp. on Eng. Problems of Fusion Research, Chicago Ill., Oct. 1981, Kozub et al., pp. 912–915.

*Primary Examiner*—Harvey E. Behrend

*Attorney, Agent, or Firm*—Paul A. Gottlieb; Judson R. Hightower

[57] ABSTRACT

An arrangement is provided for the in-situ determination of energy species yields of intense particle beams. The beam is directed onto a target surface of known composition, such that Rutherford backscattering of the beam occurs. The yield-energy characteristic response of the beam to backscattering from the target is analyzed using Rutherford backscattering techniques to determine the yields of energy species components of the beam.

6 Claims, 13 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

IN-SITU DETERMINATION OF ENERGY SPECIES YIELDS OF INTENSE PARTICLE BEAMS

CONTRACTUAL ORIGIN OF THE INVENTION

The United States Government has rights in this invention under Contract No. DE-AC02-76CH03073 between the U.S. Department of Energy and the Princeton University.

This is a continuation of application Ser. No. 535,974 filed Sept. 26, 1983, now abandoned.

BACKGROUND OF THE INVENTION

This invention pertains to the measurement of radial profiles of energy components of intense particle beams, and relates especially to neutral beams used in the heating of a fusion plasma.

A number of approaches are currently being studied in the development of nuclear fusion as a long-term energy source. Several of the more promising approaches involve the confinement, by means of strong magnetic fields, of a highly energetic plasma possessing extremely high temperature and densities, so as to cause the fusing of atoms, such as deuterium and tritium, and the resulting production of energy.

It has been found that one of the most efficient configurations for optimum plasma containment is in the form of a toroid or "doughnut". This has given rise to the tokamak fusion reactor design which is currently under intensive study by research groups in a number of countries. By means of a circular arrangement of powerful magnets, a toroidal magnetic field is formed for the confinement of an energetic plasma comprised primarily of protons and deuterons.

Once generated, the confined energetic plasma must be sustained by means of an external source. Further, the plasma must be continuously re-fueled during reactor operation. One method of heating and fueling the plasma, and thus energizing the plasma particles confined, includes the injection of a beam of energetic neutrals into a plasma. Neutral beam injection methods have become technologically feasible with the recent development of efficient, high-power neutral beam modules such as those described in the following: V. D. Shafranov and E. I. Yurchenko, Nuclear Fusion 8, 329 (1968); L. D. Stewart, R. C. Davis, J. T. Hogan, T. C. Jernigan, O. B. Morgan, and W. L. Stirling, Garching-/Munich Conference, 1973, paper E 12; W. L. Stirling, R. C. Davis, T. C. Jernigan, O. B. Morgan, J. J. Orzechowski, G. Schilling and L. D. Stewart, paper d-5 at Second International Conference on Ion Sources, Vienna, 1972; K. W. Ehlers and W. B. Kunkel, paper d-3 at Second International Conference on Ion Sources, Vienna, 1972; and W. L. Gardner et al, Rev. Sci. Inst. 53, 424 (1982). Since the beam power absorbed by the plasma exceeds the ohmic heating power, neutral beams cause significant heating. Neutral beams also provide a particle source to offset the fusion losses, and could be used to maintain an electric current in the plasma, as described in the following: T. Ohkawa, Nuclear Fusion 10, 185 (1970); R. J. Bickerton, Comments on Plasma Phys. and Controlled Fusion 1, 95 (1972); and J. D. Callen, J. F. Clarke and J. A. Rome, Garching/Munich Conference, 1973, paper E-14. The neutral beam injection method of plasma heating is currently being tested in a number of research facilities, including the Poloidal Divertor Experiment (PDX) located at the Princeton Plasma Physics Laboratory in New Jersey, the ISX-B project at the Oak Ridge National Laboratory, the Doublet III project at GA Technologies, and the ASDEX studies at the Institute for Plasma Physics in Garching, West Germany.

A typical neutral beam injector consists of only a few basic parts. First, there is a plasma source, such as the duo-PiGatron. Ions extracted from the plasma meniscus are accessed through a multiple-aperture (approximately 2000, 3-4 mm diameter hole) plate. The ions are then accelerated in a multiple aperture accel-decel electrode system to typical energies of 40-50 keV, and enter a charge-exchange neutralization cell which contains a neutral gas such as $H_2$ or $D_2$. At the neutralization cell outlet, about 60-80% of the ions have been converted into energetic neutrals, which are then injected into the fusion plasma. Ions remaining at the end of the charge-exchange cell are bent out of the beam path by an ion deflection magnet usually contained within the vacuum enclosure of the injection system. As the energetic neutrals from the neutral beam penetrate into the confined fusion plasma, they undergo ionization by charge-exchange with the plasma ions. After being "ionized," the fast ions from neutral beam injection circulate around the fusion reactor along particle orbits that follow the magnetic field lines. Plasma heating results from the slowing down of the fast ions by collisions with the background plasma ions and the electrons. For fusion plasma heating, neutral beam efficiencies are found to be a very sensitive function of neutral species energy yields of the neutral beam. Hence, practical neutral beam injection systems should include a provision for accurate determination of energy species yields.

High energy particle beams have also found wide use in science and industry. In typical applications, beams are first accelerated to a desired energy, and are then used to analyze or modify various targets. In nuclear research for example, particle beams are used to analyze the basic physical properties of subatomic systems, whereas in solid state physics research, particle beams are used to study the physical properties of surfaces, crystals, and thin films. Beams are also used to modify targets, as in the commercial production of radio-pharmaceuticals, ion-implanted semiconductor devices, and the heating of fusion reactor plasmas. Most particle beam applications require a control or knowledge of beam properties, such as energy, mass, charge, and species (i.e., energy components). Typical acceleration methods usually produce particle beams containing several different simultaneously-appearing atomic species. This is due to the variety of atomic processes that occur in the ion sources from which particle beams are extracted prior to acceleration. For example, a deuterium ion source is fed diatomic deuterium gas ($D_2$) from a gas cylinder. The deuterium gas, upon entering the ion source, is decomposed into ions of atomic deuterium ($D+$), ions of diatomic molecular deuterium ($D_2+$), and stable ions of triatomic molecular deuterium ($D_3+$). The extraction and acceleration of these ions to an energy E produces a beam with three molecular species, each of which initially have the same energy. However, collisions of the molecular $D_2+$ and $D_3+$ beam species with gas in the beam acceleration system causes a decomposition of these molecular species into atomic particles having energies of one-half (E/2) and one-third (E/3) of the initial acceleration energy (E). Thus, the resulting beam can consist of particles having several different energies.

Similar processes occur with other kinds of beams. In some applications, it is necessary to filter the ion beam using magnetic or electrostatic devices to prevent undesirable beam species from reaching the target. In other applications, such as the beam injecting systems used to heat the fusion reactor plasmas for example, pre-neutralization beam filtering is impractical due to the size, cost, and complexities involved. It is nevertheless desirable to know the neutral energy species content of such beams in order to optimize ion source performance in the beam-target interaction. Even in cases where beam filtering is used, it may be desirable to have the capability of detecting the presence of unwanted energy species resulting from system inefficiencies or defects.

Several well-known methods of measuring the energy species content of particle beams are surveyed in an article by C. C. Tsai et al, Oak Ridge National Laboratory Technical Memo, ORNL TM-8360, Aug. 8, 1982. Each of these methods has limitations. For example, energy and momentum analysis methods which use electric/magnetic fields are limited to relatively low beam-currents, usually at a single point in the beam, and require that the beam particles be in a known ionic charge state. If the beam consists of neural particles, a gas-stripper cell or foil must be used to ionize the beam prior to analysis. Since the analysis still requires electric/magnetic fields, the same limitations just mentioned apply, with added complexity stemming from the gas handling and support requirements of gas cells or foils.

Optical diagnostic methods of detecting the Doppler shift in the wavelength of light emitted by beam species moving at different velocities require relatively high background gas pressures to give detectable light output. The beam line regions having sufficient gas pressure for optical diagnostics are frequently located far from the target region, thereby allowing undetected changes to occur in the beam before the beam strikes the target. In the case of powerful neutral beams used to heat fusion reactor plasmas, optical species measurements must be made near the ion source, in a region containing both neutral and ionic particles which thereafter pass through a high gas density. Hence, measurements made with these diagnostic techniques must be extrapolated in order to estimate the state of the beam as it interacts with the target plasma.

It is therefore an object of the present invention to provide particle beam energy species analyses applicable to either ion or neutral beams, that allows accurate, prompt, direct, position-dependent, in-situ measurements of the beam energy species.

Operating tokamaks constitute a hostile environment for any in situ diagnostic technique, and concern over stray magnetic fields and electrical noise have discouraged proposals to consider sensitive particle in-situ measurements.

It is an object of the present invention to provide analyses of the aforementioned type for fusion reactor plasmas which are heated by intense neutral beams, where heating efficiency is a sensitive function of $D^{\circ}(E)$, the full energy species component of the heating beam.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

These and other objects of the present invention are provided for a particle beam having a full energy component at least as great as 25 keV, which is directed onto a beamstop target, such that Rutherford backscattering, preferably near-surface backscattering occurs. The geometry, material composition and impurity concentration of the beam stop are predetermined, using any suitable conventional technique. The energy-yield characteristic response of backscattered particles is measured over a range of angles using a fast ion electrostatic analyzer having a microchannel plate array at its focal plane. The knee of the resulting yield curve, on a plot of yield versus energy, is analyzed to determine the energy species components of various beam particles having the same mass.

DETAILED DESCRIPTION OF THE PREFERRED EMBODIMENT

The present invention utilizes Rutherford backscatter analysis techniques to measure the energy species content of an intense particle beam (i.e. neutral or ion beam) which is scattered from a target surface. As will be explained hereinafter, the measurement is performed in a manner that yields fast, reproducible results with simple analyses, using well-known parameters.

Rutherford backscattering analysis, particularly Rutherford Backscattering Spectroscopy (RBS) has been used to study materials exposed to energetic particles in general (H. Uecker et al, J. of Nucl. Mat. 93 and 94 (1980) 670, and M. Braun et al, J. of Nucl Mat. 93 and 94 (1980) 728) and tokamak plasma ions in particular (R. A. Zuhr et al, J. of Nucl. Mat. 93 and 94 (1980) 127, J. B. Roberto et al, J. of Nucl. Mat. 93 and 94 (1980) 146, W. R. Wampler et al, J. of Nucl. Mat. 93 and 94 (1980), 139). The technique has even been used to study the composition of ion and neutral beams (R. A. Langley et al., J. of Nucl. Mat. 93 and 94 (1980), 390, and A. Pospieszczyk et al, J. of Nucl. Mat. 93 and 94 (1980) 396). In these and all other earlier studies, the material imbedded in the exposed sample is the unknown, and was examined with the Rutherford back-scattering technique utilizing a known Van de Graaff accelerator beam. In the present invention, the target material off of which the Rutherford backscattering is performed, is known, whereas the particle beam which strikes the target material is unknown. That is, in contrast to the established Rutherford backscatter spectrometry technique for analyzing unknown targets using a known particle beam, the present invention uses a known target to determine unknown beam properties, particularly the energy species content of an intense incident neutral beam. Further, conventional RBS techniques require the exposed sample to be removed to a separate facility (i.e. the Van de Graaf accelerator laboratory) for analysis, whereas in the present invention, every component remains in situ. Neither a Van de Graff accelerator nor any other facility is required.

Figure 1:
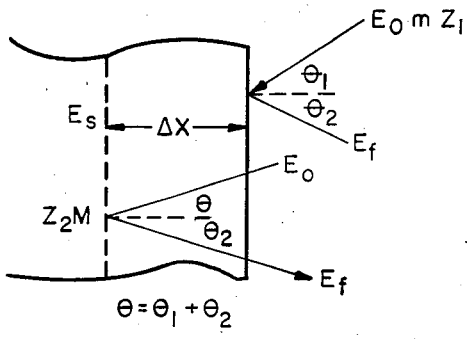
FIG. 1 is a schematic diagram illustrating near-surface backscattering.
Figure 2:
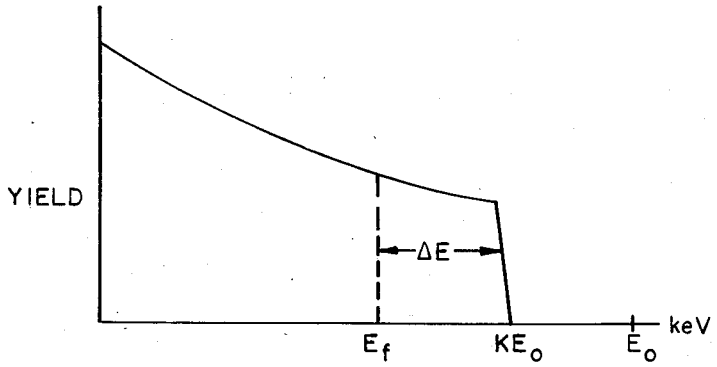
FIG. 2 shows a schematic diagram of yield-versus-energy of the backscattered particles of FIG. 1.

Most energetic neutral beam particles incident on a solid target come to rest on the target. However, a small fraction of the incident beam particles collide with nuclei and are reflected out of the target. The recoil energy of these backscattered particles is governed by well-known laws of classical mechanics. Their angular distribution and yield at a particular angle are described by the Rutherford elastic cross section. In particular, beam particles of energy $E_0$ reflected from the top surface layer of a target recoil with a kinetic energy ($KE_0$) less than $E_0$, where the kinematic factor K is given by equation 1 of Table I, wherein m is the incident particle mass, M is the target nucleus mass, and $\theta$ is the recoil angle, or net angle between the incoming and the outgoing particle, as can be seen with reference to the diagram of FIG. 1. The maximum energy resolution of the backscattered particles is obtained when K is as close to 1 as possible. Hence, for a given beam particle mass (m), the target nucleus mass (M) should be as large as possible, and the detection of backscatter particles should take place as close to a recoil angle $\theta$ of 180° as is permitted by the detection geometry. The probability that particles entering the target lose energy and interact (i.e., backscatter) with target nuclei at an energy less than $E_0$, increases as their energy decreases. Hence, the backscattered particles have an energy distribution and a yield which increases with decreasing energy, as can be seen with reference to the yield-versus-energy plot of FIG. 2. This behavior is described approximately by the single collision Rutherford elastic cross-section given in equation number 2 of Table I. In this equation, $\sigma$ is the cross section $Z_1$ and $Z_2$ are atomic numbers of the beam and target species, and E is beam energy.

Figure 3:
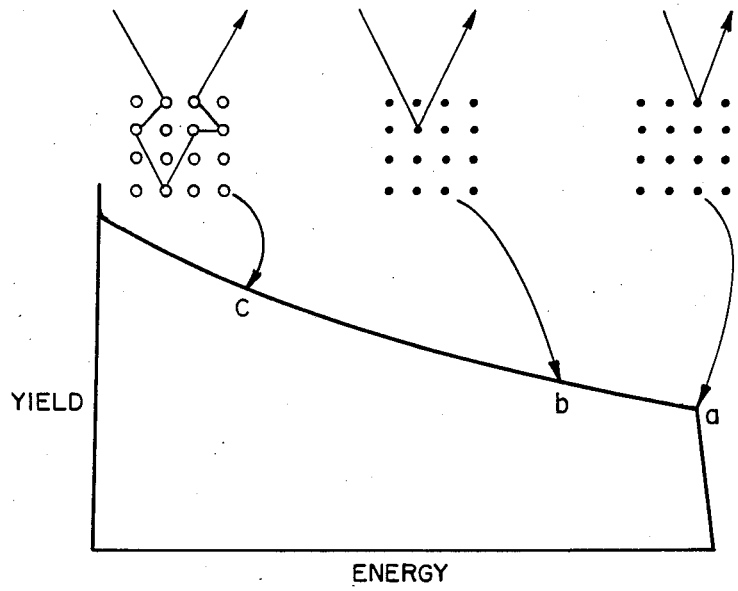
FIG. 3 shows the plot of FIG. 2, with reference to near-surface and far-surface backscatter components.

In particular, the backscatter yields from near surface scattering are well-described by the Rutherford cross-section, whereas for scattering from depths far from the surface, the shape and height deviates slowly from the behavior expected from the single collisions due in part to multiple scattering. This can be seen with reference to FIG. 3 wherein the three diagrams appearing above the curve refer to planes of atomic particles forming the near-surface of the target. As shown in FIG. 3, which illustrates the energy yield for a thick target, the backscatter yields from near-surface scattering are well described by the Rutherford cross-section, whereas the shape and height of the backscatter spectrum deviates from this cross-section for scattering from depths which are far from the surface, due principally to multiple scattering events. The preferred embodiment of the present invention will be described with respect to near-surface approximations, although the scope of the present invention covers more rigorous back-scattering analyses as well.

Referring again to FIGS. 1 and 2, the energy difference $\Delta E$ is defined as $KE_0 - E_f$, where $E_f$ is given by equation 4 of Table I. The surface approximation of the schematic energy spectrum from a FIG. 3 target is given by equation 4 of Table I, where dE/dX is the rate of energy loss and, where the quantity in parentheses is indicated by the variable S in equation 5 of Table I.

Figure 4:
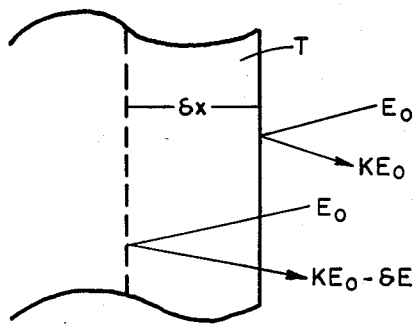
FIG. 4 is a schematic diagram showing a near-surface approximation of a thick target.
Figure 5:
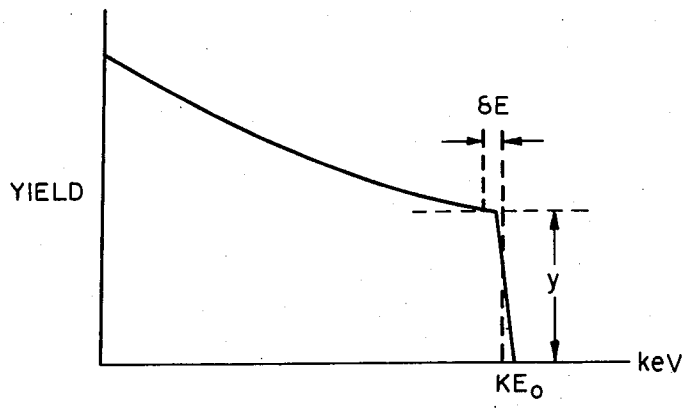
FIG. 5 shows a plot of yield-versus-energy of the back-scattered particles of FIG. 4.

Referring now to FIGS. 4 and 5, the height of the energy spectrum for a near-surface approximation of a thick target gives a yield (Y) which is defined by equation 6 of Table I, where $D^0$ is the number of incident particles, $\phi\delta\chi$ is the number of target atoms per unit area, $\sigma$ is the Rutherford elastic cross-section, S is the measured back-scatter energy loss factor as defined in Equation 5, $\delta$ E is the detector energy channel width, $\Omega$ is the detector solid angle and f is the detection efficiency of the analyzer used to measure the backscattering yield. Substituting $\Delta x$ in equation 5, gives an expression for the yield Y in equation 7 of Table I.

Figure 6:
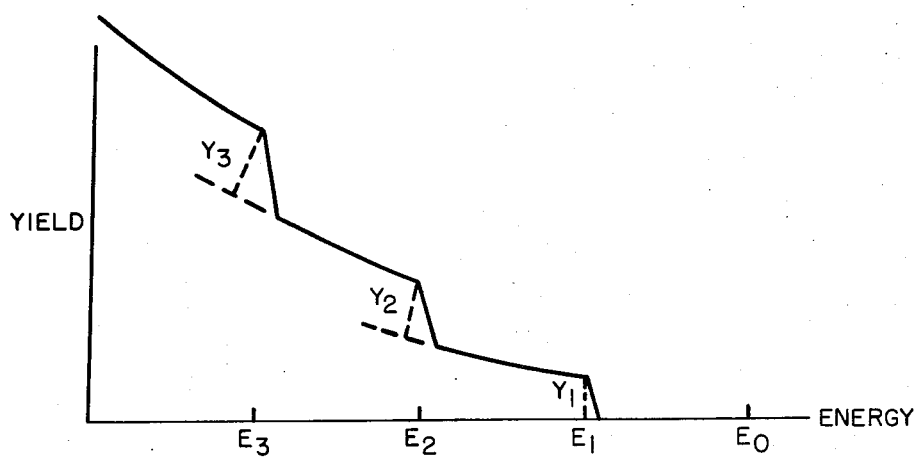
FIG. 6 is a schematic diagram which illustrates yield-versus-energy of backscattered particles having multiple energy-species components.

In the preferred embodiment of the present invention, attention is directed to that portion of the yield curve due to near surface scattering, as found at the knee of the yield curve (See FIG. 5). Focusing attention on the near-surface back-scattering simplifies the energy species analyses and yields acceptably accurate results in many applications. Consider, for example, a deuterium beam with a single species having a yield (Y) due to scattering from the near surface layer, as given by Equation 6. It can be seen that the yield is directly proportional to the number of incident particles ($D^0$) and several other readily obtainable material characterization and geometric parameters. If a particle beam has several species components, each with the same mass but having different energies, (such as in the case of neutral deuterium beams used for heating fusion reactors plasmas) the backscatter yield of a beam with energy components or species $D^0(E)$. $D^0(E/2)$, $D^0(E/3)$ will be as shown in FIG. 6. The respective yields $Y_1$, $Y_2$, $Y_3$ are shown in Table I as Equation 8–10, having a form similar to that of Equation 6.

The ratios of the number of beam particles having energies E to those having one-half energy E/2 is given by Equation 11 of Table I, which follows directly from Equations 8 and 9. Similarly, the ratio of the number of beam particles having full energy E to those having one-third energy E/3 is given by Equation 12 of Table I, which follows from Equations 8 and 10.

Figure 7:
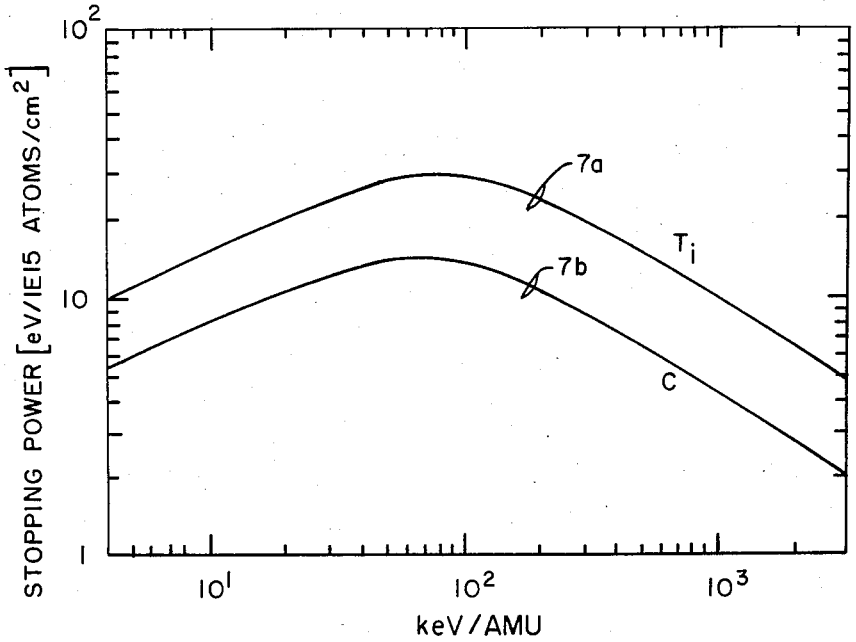
FIG. 7 is a graph of the stopping power of various target materials.

Note that since the same detector is used to measure the full energy, one-half energy and one-third energy, the detector geometry factor $\Omega$ cancels, and the resulting ratios are independent of the geometrical efficiency. The resulting ratios for the respective species yields are given in terms of the measured surface yields, the respective backscatter energies, an energy-dependent detection efficiency, and a parameter characteristic of the rate of energy loss in the target, which as can be seen with reference to FIG. 7, shows the stopping powers of hydrogen and deuterium in titanium and carbon (curves *7a*, *7b*, respectively). The near-surface composition of the target is characterized with reference to the graph of FIG. 7, wherein the ordinate expresses stopping power (or the rate of energy loss for given target materials), while the abscissa expresses normalized particle energy in keV/AMU. The energy loss factor (See eq. 5) for a given beam and target can be calculated using the energy loss rates (dE/dX) tabulated in the literature, such as in the article by H. H. Anderson, R. F. Ziegler, *The Stopping and Ranges of Ions in Matter*, Vol. 3, Pergamon Press, New York (1977). Thus, the species intensities in the particle beam are given simply and accurately in terms of directly measured quantities.

In the case of a beam having species with the same energy but differing mass (m) or atomic number (Z), the analysis follows from equations 8–10 in a similar manner. For different masses, the kinematic factor K from equation 1 will not be the same, so the $\delta$ E and S(E) in equations 8–10 for each mass have to be computed with the same $E_o$, but with a different K (equations 3–5). Since the Rutherford cross sections also depend on the mass, the ratios in equations 11 and 12 have to include the ratios of these cross sections as computed using equation 2. For different atomic numbers, the K-factors will be the same, but the Z-dependence of the Rutherford cross section will also require their inclusion in equations 11 and 12. Thus, equations 8–10 will be identical in form in both cases, but the different Rutherford cross sections will mean that equations 11 and 12 will have the form of equations 13 and 14 of Table I.

The preferred embodiment of the present invention has been described with reference to the near-surface approximation of Equation 6, corresponding to the determination of point "a" in FIG. 3, for example. However, those skilled in the art will appreciate that the present invention also covers more rigorous treatment of yield as a function of energy and D° in particular. These more rigorous techniques would be employed, for example, to determine D° from the area under the yield-energy curve of FIG. 3, as opposed to the linear expression of point a in that figure. Such rigorous techniques will be readily apparent to those having ordinary skill of the art, and will not be set out in the general discussion of the invention presented here. In any event, the individual energy species D° of the several beam components are derived from the yield-energy relationship of the overall beam. A more rigorous approach than that of equation 6 would still involve the same variables as those set out in that equation, but higher-order terms will be included. Once the yield-energy relationship of the beam is determined, the individual species components $D_i°$ can be obtained using such material characterization factors as $\sigma S$ and $\phi$, and such geometric factors as $\phi\delta x$, $\delta E$ and $\Omega f$, all of which are readily determinable by those skilled in the art. Alternatively, numerical, computer-aided analysis of a series of energy yield component curves can be modeled and applied to solve unknown complex systems.

The preferred embodiment of the present invention includes a fast ion electrostatic analyzer with a microchannel plate (MCP) array at its focal plane. The analyzer is described in an article by R. Kaita, one of the inventors of the present invention, and others, in the Review of Scientific Instruments, Vol. 52, No. 12, December (1981) on page 1795.

Figure 8:
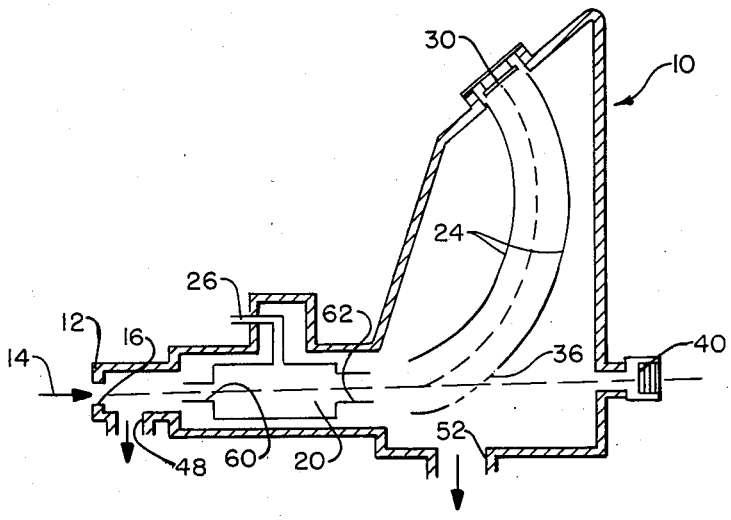
FIG. 8 is a cross-sectional view of a fast ion electrostatic analyzer used in the present invention.

Referring now to FIG. 8, a fast ion electrostatic analyzer 10 is shown having an outer vacuum housing 12. An incident neutral beam 14 enters analyzer 10 through an orifice 16 in the outer vacuum housing 12. The incident beam thereupon passes through a gas-stripping cell 20 where neutral particles are ionized, rendering the particles deflectable by electrostatic deflection plates 24. Helium stripping gas enters cell 20 at inlet 26. According to the voltage applied to electrostatic deflection plates 24, a portion of the incident particles 14 within a specific energy range is directed by the plates 24 onto a microchannel plate array (MCP) 30. The portion of particles 14 not deflected by plates 24 continue in a straight-line trajectory through nickel mesh 36 to a beam dump 40. Vacuum within the housing 12 is maintained by a 1500 liter/second pump (Sargent-Welch Model 3133 C turbomolecular pump) at an orifice 48 near the front of the analyzer, and by two vacuum pumps connected to orifices 52 near the rear of the analyzer. These two pumps are of the 1500 liter/second, Leybold-Heraeus Model NT 1500 turbomolecular pump type. The gas stripping cell 20 and the walls of the vacuum chamber 12 surrounding the stripping cell are made of soft iron, thus providing a double shielding against stray fields of nearby apparatus (e.g. tokamaks), serviced by the neutral beam.

In the preferred embodiment, neutral beam experiments were performed on Princeton Plasma Physics Laboratory Poloidal Divertor Experiment machine located in Princeton, N.J. The Poloidal Divertor Experiment (PDX) generated strong electric and magnetic confinement fields representing a source of potential electromagnetic interference with the sensitive analyzer operation. The stripping cell is comprised of one large, long stripping cell, with flow restrictors 60, 62 located at each end. The restrictors are essentially long rectangular tubes that provide a minimum of interference for the energetic particles traveling along linear trajectory 14, but reduce the conductance of the helium stripping gas out of the main stripping chamber. By using one long stripping cell whose length constituted a significant fraction of the flight path instead of many individual cells for each trajectory, the cell design was greatly simplified. Also, signal scattering due to angular scattering by the lower energy ions was presumably increased somewhat by this geometry, but the primary application of this system is to measure ions in the 10–60 keV range where scattering in the cell is small. A pressure difference between the stripping cell 20 which was held at 0.5 mTorr of helium gas, and the rest of the system (which was held between 0.01 and 0.02 mTorr) was maintained using the design pumping capability of 4500 liter/-second.

The energy of incident neutrals is determined electrostatically in detector 10, as they emerge as ions from stripping cell 20. The ions pass between two cylindrical plates 24 which bend the ions through an angle of 127°, an angle chosen to provide a maximum angular focussing in the vertical direction. The plates 24 are shielded from external magnetic fields by a soft iron enclosure (not shown) inside the vacuum chamber 12. Since the chamber walls themselves are also made of soft iron, the deflection plates, like the stripping cell, have a double iron shield. All iron components were plated with 0.013 mm of nickel to protect them against oxidation.

After passing through the electrostatic deflection plates 24, the ions strike MCP array 30. This array consists of 4 detectors composed of 30 strips, each 1 cm long and 0.5 cm wide. Since each MCP strip has its own anode electrode, the position at which a particular ion strikes the array is known. This determines the geometry of the trajectories that the ions had to follow, and enables an "imaging" of the plasma from the measured ion distribution. The analyzer can be aimed so that some detectors may see a signal "peak" while others might be looking off center (FIG. 13) at the same time. The individual MCP detectors can be biased to different voltages, providing a spatially variable gain for such situations where the flux varies strongly across the MCP array.

The detection method of the preferred embodiment allows a complete backscatter spectrum to be measured as rapidly as every 20 milliseconds. The energy species yields of a neutral beam can be obtained from the spectra by manual calculations (as set forth in an article by H. W. Kugel, R. Kaita, R. J. Goldston, D. D. Meyerhofer, J. T. Kozub, and M. D. Williams, Bull. Am, Phys. Soc. 27, 1049, (October 1982)) or automatically, using data processing equipment which implements the same calculations. A particular feature of the present invention is the use of the aforementioned analyzer to detect particles incident upon the analyzer from up to five different angles (all lying in a horizontal plane) by collecting and amplifying signals from five different sections of the MCP array 30. This allows the analyzer to simultaneously detect particles backscattered from five different horizontal locations spaced-apart across the target, thus providing a measure of the radial distribution of the energy species components which lie in a plane perpendicular to the beam axis. The number of detected angles ("channels") or sections of the MCP array can be increased simply by fabricating more electronics to provide a larger section of the MCP array, thereby giving greater spatial resolution.

As mentioned earlier, the MCP array consists of four detectors each with 30 strips, for a total of 120 strips. Each of the five amplifier modules is capable of handling signals from 6 of these strips, so any thirty of them can be monitored simultaneously. Spreading the amplifier modules across the MCP array was quite adequate for obtaining the beam profile data shown on FIG. 12, but if more resolution is required, additional amplifiers could be built to cover additional strips, or the entire analyzer can be moved for different views during subsequent beam pulses.

In the preferred embodiment, the entire analyzer pivots horizontally so as to allow a continuous change in the viewing angle. Thus, the entire target can be scanned (in a horizontal plane) to give a continuous measurement of the radial distribution of the beam species components across the beam. Of course, including a larger number of viewing angles obviates the need to pivot the analyzer in order to scan the target. This radial profile is an important measurement for optimizing the beam system performance. The efficiency of plasma heating with neutral beams is dependent on how much full energy component there is and its spatial distribution, so knowing this information is needed to tune the beam for best operation.

As an alternative to the fast ion electrostatic analyzer described above, other types of detection devices such as solid state surface barrier detectors, scintillators, and faraday cups could be used. Attenuation of the backscattered particles, before they are detected, by the residual gas that remains between tokamak plasma discharges might make the technique of the present invention seem impractical, but (for the multi-keV particles produced by present-day neutral beams, at least) this has been confirmed not to be a problem. Furthermore, use of high gain ($10^6$–$10^7$) MCP detectors makes a high back-scattered particle flux unnecessary.

The preferred embodiment according to the present invention will be described with reference to the Poloidal Divertor Experiment (PDX) located at the Princeton University Plasma Physics Laboratory (PPPL) in Princeton, N.J. The PDX Tokamak provides an experimental facility for the direct comparison of various impurity control techniques under reactor-like conditions, as explained in an article by D. Meade et al, in "Plasma Physics and Controlled Nuclear Fusion Research 1981" (Proc. 8th Int. Conf., Brussels, 1980), IAEA, Vienna 1, 665 (1981). The principle method employed to raise the temperature of a tokamak plasma to reactor levels will comprise neutral beam injection heating. The PDX neutral beam system consists of four beam injectors. An energetic-ion source accelerates charged particles up to 50 keV. The object is to introduce these energetic neutral particles into the magnetic confining region of PDX, but since charged particles would be deflected by the confining field, they must first be neutralized without loss of energy. This is accomplished in the neutralizer gas cell where most of the ions pick up an electron on the way through the cell. The particles emerge from the neutralizing cell as high energy neutrals, leaving behind low-energy ions. The few ions which pass through the neutralizing cell without undergoing charge exchange are magnetically deflected to an ion dump.

The rest of the beam penetrates the intended distance into the magnetic field of the PDX, and is re-ionized by collisions with the plasma already present. The beam particles, no longer neutral but a mixture of energetic ions and electrons, are magnetically trapped, becoming additions to the plasma population. The particles immediately enter into confined orbits along which further collisions take place. The result is a gradual slowing down of the fast ions with attendant heating of the background plasma. Four neutral beam lines can inject up to seven megawatts of neutral beam power for 300 milliseconds.

Figure 9:
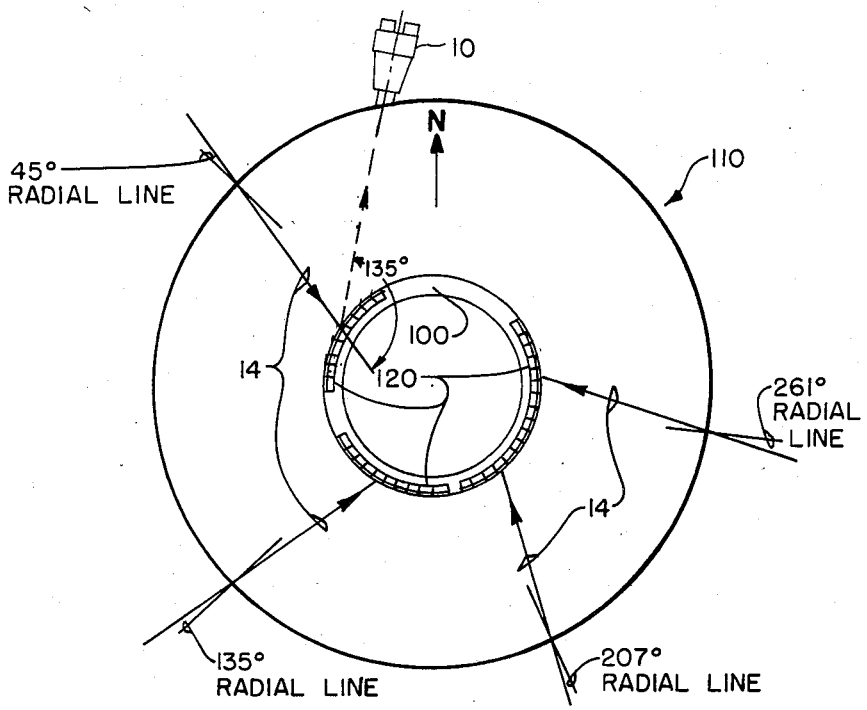
FIG. 9 is a plan view of a test set-up according to the invention.

As can be seen with reference to FIG. 9, the injection angle of each neutral beam relative to the radial line is 9°, coincident with the direction of the plasma current. The neutral beams, if not absorbed by an intervening plasma, fall incident upon the inner wall 100 of the PDX Tokamak 110. The inner wall protective plates 120, provided for protection of the inner wall 100, are designed to absorb 8 megawatts of neutral deuterium beam power at maximum power densities of 3 kW/cm$^2$, for pulse lengths of 0.5 seconds. The protective plate design consists of a tile and mounting plate structure. The mounting plates are water-cooled to allow short duty cycles and beam calorimetry. While several material combinations for the tiles were proposed, titanium-carbide-coated graphite was selected as the tile material. The design of the PDX Tokamak wall armor and inner limiter system is described in an article by H. W. Kugel, an inventor of the present invention and M. Ulrickson, as published in J. Nucl. Tech./Fus. 2, 712, (1982).

Accurate calibration of neutral species energy yields [$D_0(E)$, $D^0(E/2)$, $D^0(E/3)$] injected during plasma heating experiments is important for diagnosing the conditions under which high temperature plasmas can be achieved. The actual neutral species yields that are present during heating operations may differ from species yields measured off-line on test stands (cited, for example, in an article entitled, "Determination of Species Yield of Ion Sources Used for Intense Neutral Beam Injection", C. C; Tsai, C. F. Barnett, H. H. Haselton, R. A. Langley, and W. L. Sterling, Oak Ridge National Lab Technical Memo ORNL/TM 8360, August, 1982). In the preferred embodiment, the species yield of one neutral beam injection system in the PDX machine, (the NW or 45° neutral beam injection system) was measured under operating conditions, in-situ, using the electrostatic analyzer 10 described above. The analyzer detected beam particles Rutherford-backscattered from the "thick" target of PDX inner wall armor 120, in the absence of the plasma in the PDX machine 110. Beams of 25–47 keV $D^0$ were Rutherford-backscattered at angles 135° from the TiC inner wall armor 120 of the PDX machine 110. Measurements were performed with and without the PDX toroidal magnetic fields. Data were obtained at five horizontal detection angles simultaneously, thereby allowing species measurements to be made across the beam 14. Complete energy scans were made every 20 milliseconds during the beam pulse. A range of operating conditions were studied.

Figure 10:
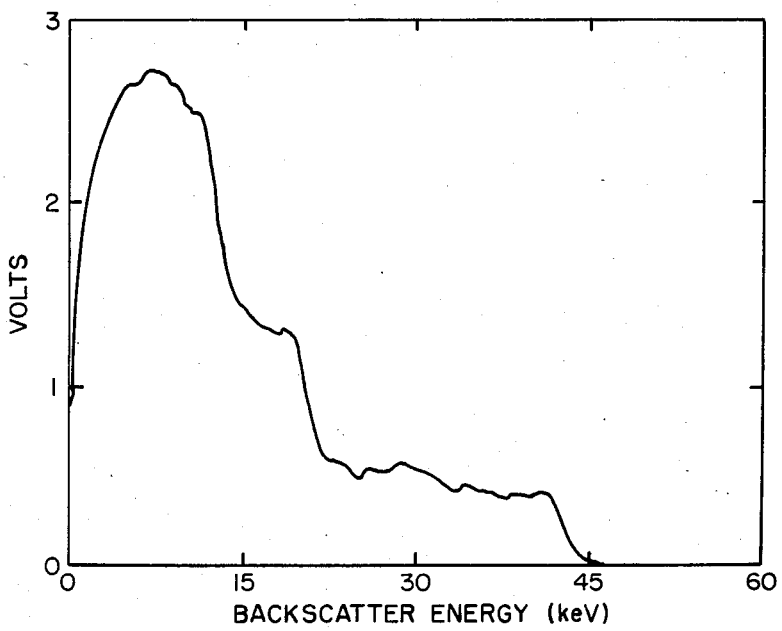
FIG. 10 shows a typical backscatter spectrum obtained with the present invention.
Figure 11:
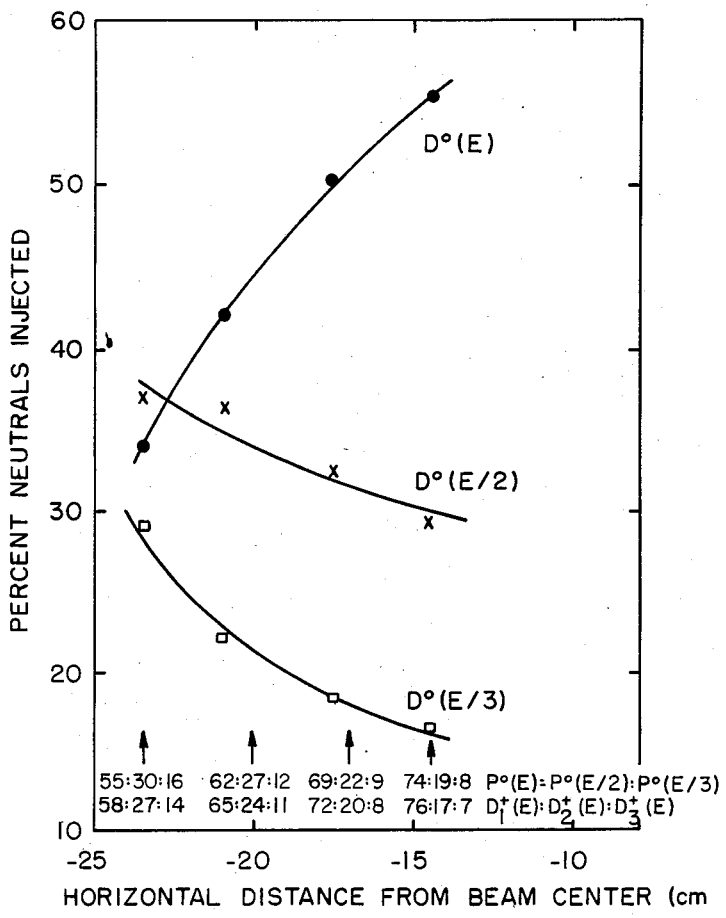
FIG. 11 is a plot showing the radial distribution of injected neutrals.
Figure 12:
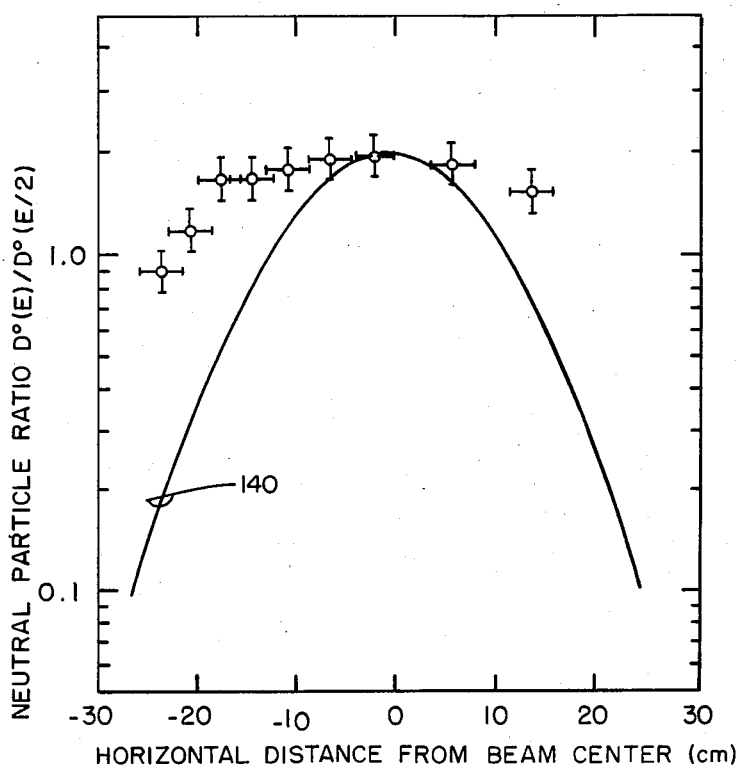
FIG. 12 is a graph showing the radial distribution of neutral particle energy species.

Utilizing the setup described immediately above, a typical backscatter spectrum, such as that shown in FIG. 10, was obtained every 20 milliseconds for a 47 keV $D^0$ beam incident near beam center. FIG. 11 shows a plot of the percentage of neutrals injected versus horizontal distance from the beam center, in centimeters. FIG. 12 shows the ratio of the neutral full energy component to the half energy component, versus horizontal distance from beam center. A solid line, designated by numeral 140, represents a gaussian least-squares-fit to the beam power density profile as measured by an array of thermocouples located on the inner wall armor of the PDX machine.

Figure 13:
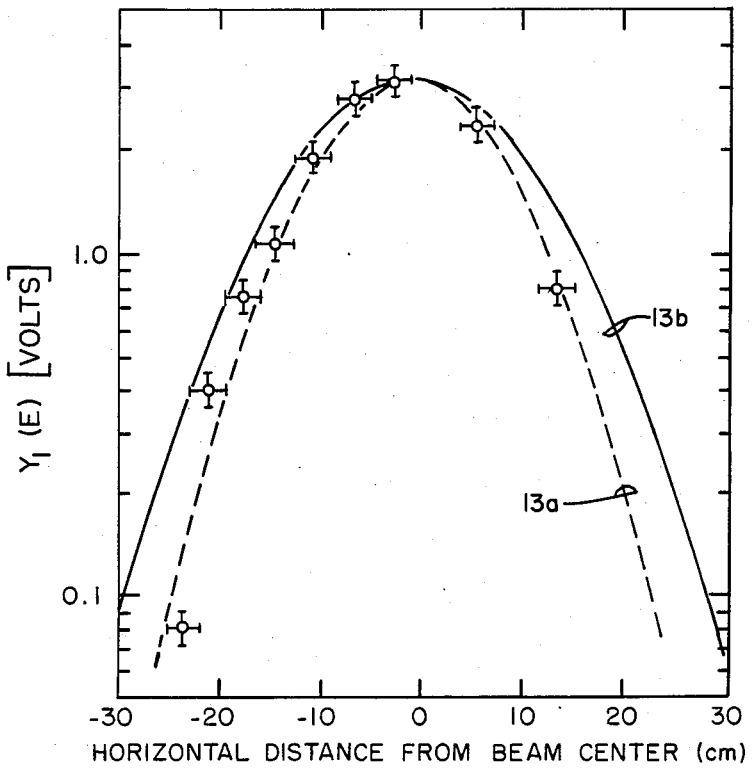
FIG. 13 is a radial distribution of the full energy neutral component signal amplitudes of backscattered particles.

FIG. 13 shows a graph of backscatter signal amplitude (Y) from the full energy component versus horizontal distance across the beam. Dashed line **13*a* and solid line 13*b*** are the typical limits of the power profiles measured with an array of thermocouples.

TABLE I $$K = \left(\frac{m\cos\theta + [M^2 - m^2\sin^2\theta]^{\frac{1}{2}}}{m + M}\right). \quad (1)$$

DIFFERENTIAL RUTHERFORD CROSS SECTION $$\frac{d\sigma}{d\Omega} = \left(\frac{Z_1Z_2e^2}{2E\sin^2\theta}\right)^2 \frac{\left[\cos\theta + \left[1 - \left(\frac{m}{M}\sin\theta\right)^2\right]^{\frac{1}{2}}\right]^2}{\left[1 - \left(\frac{m}{M}\sin\theta\right)^2\right]^{\frac{1}{2}}} \quad (2)$$

ENERGY DIFFERENCE $\Delta E$ $$\Delta E = KE_o - E_f \quad (3)$$

$$E_f = KF_s - \int_o^{\frac{t}{\cos\theta_2}} \left(\frac{dE}{dX}\right) dX$$

$$E_s = E_o - \int_o^{\frac{t}{\cos\theta_1}} \left(\frac{dE}{dX}\right) dX$$

SURFACE APPROXIMATION

TABLE I-continued $$\Delta E = \left(\frac{K}{\cos\theta_1}\frac{dE}{dX}\Big|E_o + \frac{1}{\cos\theta_2}\frac{dE}{dX}\Big|KE_o\right)\Delta X \quad (4)$$

$$\Delta E = S\Delta X \quad (5)$$

THE YIELD (Y) IS $$Y = \Omega f(D^o\sigma_p\delta X) \quad (6)$$

SUBSTITUTING FOR $\delta X$ USING EQ. 5

$$Y = D^o\sigma\Omega f_p\frac{\delta E}{S} \quad (7)$$

$$Y_1 = D^o(E)\sigma_1\Omega_1 f_1 p\frac{\delta E_1}{S(E_1)} \quad (8)$$

$$Y_2 = D^o(E/2)\sigma_2\Omega_2 f_2 p\frac{\delta E_2}{S(E_2)} \quad (9)$$

$$Y_3 = D^o(E/3)\sigma_3\Omega_3 f_3 p\frac{\delta E_3}{S(E_3)} \quad (10)$$

IN THIS EXPERIMENT $\Omega_1 = \Omega_2 = \Omega_3$, $\frac{\delta E}{E} = 0.03$, AND $f = f(E)$. HENCE, USING THE ABOVE GIVES $$\frac{D^o(E)}{D^o(E/2)} = \left(\frac{Y_1}{Y_2}\right)\cdot\left(\frac{E_1}{E_2}\right)\cdot\left(\frac{f(E_2)}{f(E_1)}\right)\cdot\left(\frac{S(E_1)}{S(E_2)}\right) \quad (11)$$

$$\frac{D^o(E)}{D^o(E/3)} = \left(\frac{Y_1}{Y_3}\right)\cdot\left(\frac{E_1}{E_3}\right)\cdot\left(\frac{f(E_3)}{f(E_1)}\right)\cdot\left(\frac{S(E_1)}{S(E_3)}\right) \quad (12)$$

$$\frac{D^o(m_1 \text{ or } Z_1)}{D^o(m_2 \text{ or } Z_2)} = \left(\frac{\sigma_1}{\sigma_2}\right)\cdot\left(\frac{Y_1}{Y_2}\right)\cdot\left(\frac{K_1E}{K_2E}\right)\cdot\left(\frac{f(K_1E)}{f(K_2E)}\right)\cdot\left(\frac{S(K_1E)}{S(K_2E)}\right) \quad (13)$$

$$\frac{D^o(m_2 \text{ or } Z_1)}{D^o(m_3 \text{ or } Z_3)} = \left(\frac{\sigma_1}{\sigma_3}\right)\cdot\left(\frac{Y_1}{Y_3}\right)\cdot\left(\frac{K_1E}{K_3E}\right)\cdot\left(\frac{f(K_1E)}{f(K_3E)}\right)\cdot\left(\frac{S(K_1E)}{S(K_3E)}\right) \quad (14)$$

The embodiments of the invention in which an exclusive property or privilege is claimed are defined as follows:

1. In a toroidal fusion plasma device, including inner and outer confining walls, and a particle beam source for injecting a particle beam into said toroidal fusion plasma device, an arrangement for in-situ determination of species energy yields of said injected particle beam, said arrangement comprising:

(a) beam stop means having a target surface, and predetermined geometry and material properties, said beam stop means positioned on said inner confining wall such that said injected particle beam is incident on said beam stop and said incident particle beam is elastic Rutherford backscattered by said beam stop; and (b) particle energy analyzing means positioned on the outboard side of said toroidal fusion plasma device, for obtaining an energy yield characteristic response of said elastic Rutherford backscattered beam particles such that the species energy yields of said injected particle beam is determined from a Rutherford backscattering analysis.

2. In a toroidal fusion plasma device which includes inner and outer confining walls, and a particle beam source for injecting a particle beam into said toroidal fusion plasma device, a method for in-situ determination of species energy yields of said injected beam, said method comprising:

(a) elastic Rutherford backscattering said particle beam by a beam stop, positioned on said inner confining wall, having a target surface and predetermined geometry and material properties;

(b) obtaining an energy yield characteristic response of said elastic Rutherford backscattered beam particles; and (c) determining the species energy yields of said injected particle beam from a Rutherford backscattering analysis of the obtained energy yield characteristic response and said predetermined geometric and material properties of said beam stop.

3. The arrangement of claim 1 wherein said characteristic response consists essentially of a near-surface approximation of the characteristic response of the back-scattering of said beam particles by said beam stop.

4. The arrangement of claim 1 wherein said particle energy analyzing means further comprises means for simultaneously detecting the energies of said backscattered beam particles corresponding to a plurality of target positions on said target surface from which said particle beam is backscattered.

5. The arrangement of claim 1 wherein said particle energy analyzing means comprises a charge-exchange analyzer which electrostatically determines the energy of said backscattered beam particles.

6. The arrangement of claim 1 wherein the toroidal fusion plasma device further includes inner wall armor and wherein said beam stop comprised said inner wall armor of a fusion plasma device.

* * * * *